United States Patent Office 3,260,718
Patented July 12, 1966

3,260,718
MERCAPTOETHYLATING AGENT: 2-MERCAPTO-
ETHYLTRICHLOROACETATE
Dee Lynn Johnson, Rochester, N.Y., assignor to Eastman
Kodak Company, Rochester, N.Y., a corporation of
New Jersey
No Drawing. Filed Jan. 31, 1963, Ser. No. 255,181
10 Claims. (Cl. 260—247.1)

This invention concerns a process for introducing the mercaptoethyl radical into amines, more particularly the mercaptoethylation of amines and the reagent used in the mercaptoethylation.

Substituted 2-aminoethanethiols and their derivatives are required for use in many applications, particularly for use in the rubber industry, as disclosed by H. R. Snyder et al., J. Amer. Chem. Soc., v. 69, 2672 (1947). They are also useful in the pharmaceutical field as disclosed by R. O. Clinton et al., J. Amer. Chem. Soc., v. 70, 950 (1948), and in the photographic industry in photographic emulsions and as fixing agents. These compounds are also useful in chemotherapy as anti-radiation agents.

One broad class of useful mercaptan derivatives is the mercaptoethyl derivatives, in particular, those derived from amines having the general formula:

RR′NH in which R and R′ represent hydrogen, alkyl groups, for example alkyl groups having 1 to 18 carbon atoms such as methyl, amyl, isopentyl, hexyl, decyl, octadecyl, etc., aralkyl groups, for example, aralkyl groups such as benzyl, etc., or cycloalkyl groups, for example, cycloalkyl groups such as cyclopropyl, cyclohexyl, cycloheptyl, etc. Heterocyclic amines may also be used such as morpholine, piperidine, etc.

Mercaptoethylating agents are disclosed by D. D. Reynolds et al., J. Org. Chem., v. 26, 5119 (1961). 2-Mercaptoethylacetate is used as a mercaptoethylating agent for amines to form aminoethanethiols and their salts with the evolution of acetic acid. However, the side products are difficult to separate and result in considerable reduction in yield of the aminoethanethiols.

I have now found that 2-mercaptoethyltrichloroacetate is a good mercaptoethylating agent for use with amines.

One object of this invention is to provide an efficient mercaptoethylating compound. Another object is to provide an improved method of mercaptoethylating amines with good yields of aminoethanethiols.

The above objects are attained by the preparation of 2-mercaptoethyltrichloroacetate (I) by the esterification of 2-mercaptoethanol with trichloroacetic acid, according to Equation 1.

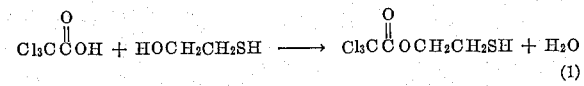
(1)

2-Mercaptoethyltrichloroacetate (I) is also available from the reaction of sodium 2-hydroxyethylmercaptide with trichloroacetyl chloride which gives 2-hydroxyethyltrichlorothioacetate (II), which spontaneously isomerizes by an S to O trichloroacetyl migration through intermediate III, (Equation 2).

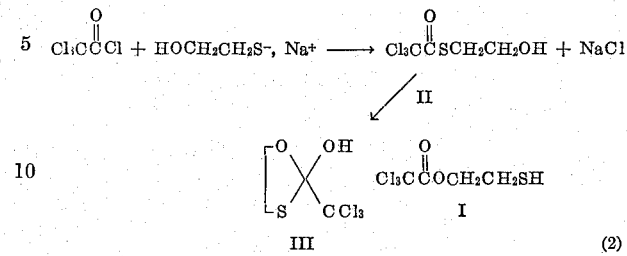
(2)

Isolation of 2-mercaptoethyltrichloroacetate (I) is not necessary prior to reaction with nucleophiles such as amines.

Because isolation of the mercaptoethylating agent is not necessary, this general method may be used in the preparation of very unstable or high-boiling substituted episulfides. The following Equation 3 is illustrative.

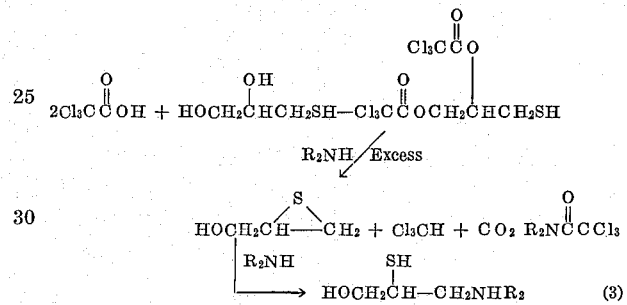
(3)

The following reaction shows the mercaptoethylation of an amine with 2-mercaptoethyltrichloroacetate (I).

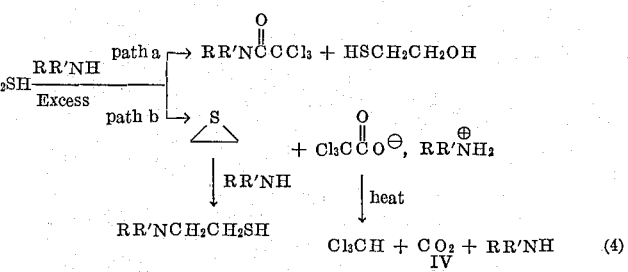
(4)

In Equation 4, R and R′ represent hydrogen, alkyl groups, for example alkyl groups having 1 to 18 carbon atoms such as methyl, amyl, isopentyl, hexyl, decyl, octadecyl, etc., aralkyl groups, for example, aralkyl groups such as benzyl, etc., or cycloalkyl groups, for example, cycloalkyl groups such as cyclopropyl, cyclohexyl, cycloheptyl, etc. R and R′ may be the same or different. Heterocyclic amines may also be used such as morpholine, piperidine, etc. Although the temperature at which the reaction takes place is not critical, it is preferred that the reaction be carried out by refluxing the reactants in a suitable non-polar solvent such as benzene, toluene, or dioxane at the reflux temperature of the solvent-amine mixture. The process may be carried out by mercaptoethylating primary and secondary amines described above by reacting 2-mercaptoethyltrichloroacetate with greater than 1 mole of the amine.

In general, any amino function in the presence of other non-participating function, for example, polyamines, polyimines, amino acids, polypeptides, proteins, amino sugars, diacetylated chitin, gelatin, and the like, can be mercaptoethylated.

The following examples are intended to illustrate my invention but not to limit it in any way.

*Example 1.—2-mercaptoethyltrichloroacetate*
*(I) (esterification)*

One mole each of trichloroacetic acid (EK 259) and 2-mercaptoethanol (EK 4196) were dissolved in 2 l. of benzene and azetropically refluxed for 30 hours with a 14″ glass-helices-packed column and a Dean-Stark trap. At the end of this time, 17 ml. of water had collected in the trap. The reaction mixture was concentrated to 300 ml. ($n_D^{25}$ 1.51) under aspirator vacuum and without purification was used in Example 2.

*Example 2.—2(morpholino)ethanethiol*

Three moles of morpholine (EK 4324) and 1.5 l. of toluene were brought to vigorous reflux in a 3 l. flask equipped with an efficient condenser. To this solution was added the 300 ml. solution of 2-mercaptoethyltrichloroacetate (Example 1) dropwise in 1 hour. The mixture was refluxed for 2 hours more and while hot 13 g. of 3-oxapentamethylene trichloroacetamide

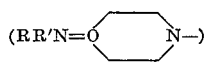

M.P. 178–179° d. were collected by vacuum filtration. From the distillation of the filtrate through a 10″ column packed with glass helices was collected 2-(morpholino)ethanethiol

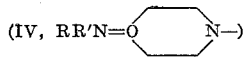

B.P. 78°/5 mm., $n_D^{25}$ 1.5027 (lit. $n_D^{25}$ 1.5025).

*Example 3.—2-mercaptoethyltrichloroacetate (I)*
*(acylhalide)*

Two moles of sodium hydroxide were dissolved in 0.5 l. of water to which was added 2.0 moles of 2-mercaptoethanol. This solution was added dropwise in 45 minutes to a vigorously-stirred solution of 2.0 moles of trichloroacetylchloride (EK 2302) in a 2 l. flask equipped with a water bath to maintain a reaction temperature of about 30°. The mixture was stirred an additional 30 minutes. The organic phase was separated and washed twice with 200 ml. of water. The benzene was removed under aspirator vacuum and the residue distilled through a 3-inch packed column, 241 g. (54 percent) of I, B.P. 46°/0.13 mm. $n_D^{25}$ 1.5043. (Elemental analysis and pH 2 of distillate indicate some free trichloroacetic acid present.)

*Analysis.*—Calc. for $C_4H_5O_2SCl_2$: C, 21.5; H, 2.2; S, 14.3; Cl, 47.5. Found: C, 22.1; H, 2.2; S, 14.0; Cl, 49.1.

*Example 4.—2-mercaptoethyltrichloroacetate*
*(esterification)*

Two moles of trichloroacetic acid and 3 moles of 2-mercaptoethanol were dissolved in 2 liters of benzene and azeotropically refluxed 15 hours under a 14-inch glass-helices-packed column and a large azeotrope distillation head. Theoretical water was collected and benzene distilled to 500 ml. volume (pot temperature 130°) $n_D^{25}$ 1.5013, I.R. spectrum—good match with that of Example 3 except for a broad, medium intensity —OH absorption (3450 cm.$^{-1}$) from the excess 2-mercaptoethanol.

*Example 5.—2-(morpholino)ethanethiol*

The 2-mercaptoethyltrichloroacetate solution from Example 4 was added dropwise in two hours to a refluxing solution of 6 moles of morpholine and 3 liters of toluene. After the addition, the mixture was refluxed overnight and stripped of solvent and excess amine. Morpholinoethanethiol, 195 g. (66.5 percent) was collected by distillation through a 10-inch packed column.

*Example 6.—2-piperidinoethanethiol*

Two moles of 2-mercaptoethyltrichloroacetate (prepared like Example 4) were added dropwise in two hours to a refluxing solution of 6 moles of piperidine and 3 liters of toluene. This was refluxed for six hours, stripped of solvent and 2-piperidinoethanethiol, 204 g. (70 percent) was distilled through a 14-inch packed column.

*Example 7.—Isopentylaminoethanethiol*

One mole of 2-mercaptoethyltrichloroacetate (one-half of a preparation like Example 4) was added dropwise in two hours to a refluxing solution of 3 moles of isopentylamine and 2 liters of toluene. The reaction was refluxed overnight and stripped of solvent under aspirator vacuum. Distillation through a 14-inch packed column gave 2-(isopentylamino)ethanethiol.

*Example 8.—2-(benzylamino)ethanethiol*

One mole of 2-mercaptoethyltrichloroacetate (one-half of a preparation like Example 4) was added dropwise in two hours to a refluxing solution of 3 moles of benzylamine and one liter of toluene. The reaction was refluxed overnight, stripped of solvent and distilled to give 2-(benzylamino)ethanethiol.

*Example 9.—2-(di-n-butylamino)ethanethiol*

Two moles of 2-mercaptoethyltrichloroacetate from a preparation like Example 1 was added dropwise in two hours to a refluxing solution of 5 moles of di-n-butylamine and 3 liters of toluene. After refluxing overnight the solvent was stripped, and distillation through a 14-inch packed column gave 2-(di-n-butylamino)ethanethiol, 244 g. (64 percent) $n_D^{25}$ 1.4619 (lit. $n_D^{29}$ 1.4620).

*Example 10.—2-(cyclohexylamino)ethanethiol*

Two moles of 2-mercaptoethyltrichloroacetate from a preparation like Example 1 was added in a thin stream in two hours to a refluxing solution of 6 moles of cyclohexylamine and 3 liters of toluene. After refluxing overnight, the reaction was stripped of solvent and distilled through a 14-inch packed column to give 2-(cyclohexylamino)ethanethiol.

The aminoethane thiols of this invention may be used in photography to fix silver halide emulsion layers subsequent to development in order to stabilize the silver image. Instead of this procedure, the aminoethane thiols may be added to the developed print in vapor form from a boiling aqueous solution with the result that a stable silver complex is formed. This procedure obviates the usual fixing and washing steps. However, the amino ethane thiols may be used in solutions for fixing prints in the usual manner, in which case they form soluble salts with the residual silver halide which can be readily washed out of the print. The solutions may further contain organic colloid, hardening agents, such as aluminum formoacetate, and potassium alum. The amino thiols will dissolve silver halide in acid solutions whereas thiols lacking an amino substituent such as mercaptoacetic acid, require alkaline conditions for fixing.

The invention has been described in detail with particular reference to preferred embodiments thereof, but it will be understood that variations and modifications can be effected within the spirit and scope of the invention as described hereinabove and as defined in the appended claims.

I claim:
1. The process which comprises contacting 2-mercaptoethyltrichloroacetate with a stoichiometric excess of an amine of the formula:

wherein R, taken singly, is selected from the group consisting of:
   (a) hydrogen and
   (b) $R^1$
and $R^1$, taken singly, is selected from the group consisting of:
   (a) alkyl, (b) aralkyl and
(c) cycloalkyl
and R and R[1], when taken collectively with the nitrogen atom to which they are attached, form a heterocyclic compound selected from the group consisting of:
(a) morpholine and
(b) piperidine.

2. The process of claim 1 in which the amine is heated under reflux with the 2-mercaptoethyltrichloroacetate.

3. The process which comprises heating 2-mercaptoethyltrichloroacetate under reflux with a stoichiometric excess of an amine of the formula:

wherein R is selected from the group consisting of:
(a) hydrogen and
(b) alkyl of up to 18 carbon atoms
and R[1] is alkyl of up to 18 carbon atoms.

4. 2-mercaptoethyltrichloroacetate.

5. A method of producing morpholinoethanethiol which comprises contacting 2-mercaptoethyltrichloroacetate with a stoichiometric excess of morpholine.

6. A method of producing 2-piperidinoethanethiol which comprises contacting 2-mercaptoethyltrichloroacetate with a stoichiometric excess of piperidine.

7. A method of producing isopentylaminoethanethiol which comprises contacting 2-mercaptoethyltrichloroacetate with a stoichiometric excess of isopentylamine.

8. A method of producing 2-(benzylamino)ethanethiol which comprises contacting 2-mercaptoethyltrichloroacetate with a stoichiometric excess of benzylamine.

9. A method of producing 2-(di-n-butylamino)ethanethiol which comprises contacting 2-mercaptoethyltrichloroacetate with a stoichiometric excess of di-n-butylamine.

10. A method of producing 2-(cyclohexylamino)ethanethiol which comprises contacting 2-mercaptoethyltrichloroacetate with a stoichiometric excess of cyclohexylamine.

References Cited by the Examiner

UNITED STATES PATENTS 2,401,234   5/1946   Farlow.

OTHER REFERENCES

Lowy et al., "An Introduction to Organic Chemistry," 6th ed., p. 213 (1945).

Meerwein et al., Chem. Ber., 64, pp. 2375–2381 (p. 2377 relied on) (1931).

Reynolds et al., J. Org. Chem., pp. 5119–5122 (61) (p. 5119 and 5120 relied upon).

WALTER A. MODANCE, *Primary Examiner.*

JOHN D. RANDOLPH, ROBERT L. PRICE, A. D. SPEVACK, *Assistant Examiners.*